Sept. 13, 1932.  F. J. LIESKE  1,877,675
SELF LOCKING VALVE
Filed Oct. 3, 1928

INVENTOR.
FRANK J. LIESKE
BY
ATTORNEY.

Patented Sept. 13, 1932

1,877,675

UNITED STATES PATENT OFFICE

FRANK J. LIESKE, OF DETROIT, MICHIGAN, ASSIGNOR, BY MESNE ASSIGNMENTS, OF ONE-HALF TO ANTHONY L. MARSHALL AND ONE-FOURTH TO JOHN F. LA GRANT, BOTH OF DETROIT, MICHIGAN

SELF LOCKING VALVE

Application filed October 3, 1928. Serial No. 310,066.

This invention relates to self locking valves and the object of the invention is to provide a valve for gas ranges which automatically locks when turned to closed position so that it cannot be opened accidentally or by young children playing about the gas range.

Another object of the invention is to provide a valve of the character described which may be manually unlocked to allow the valve to open and includes an annular member carried by the rotatable valve member and arranged to engage the valve body when in the locked position to prevent movement of the valve member in relation to the valve body.

A further object of the invention is to provide a self locking valve including an annular member of the character described carried by the rotatable valve member and slidable longitudinally thereon, the said annular member being prevented from rotation in relation to the rotatable valve member and being adapted to lock the rotatable valve member and valve body together.

A further object of the invention is to provide a valve having an annular member adapted to drop to locked position by gravity as the valve is closed and prevent reopening of the valve.

These objects and the several novel features of the invention are hereinafter more fully described and claimed and the preferred form of construction by which these objects are attained is shown in the accompanying drawing in which—

Figure 1:
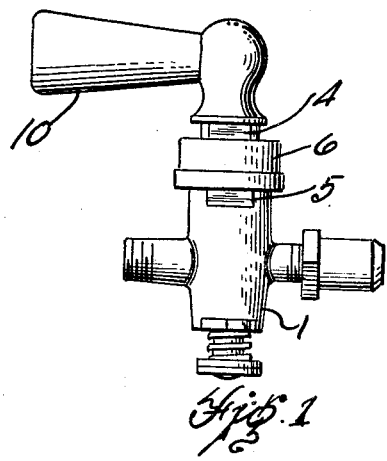
Fig. 1 is a side elevation of a valve embodying my invention in the open position.
Figure 2:
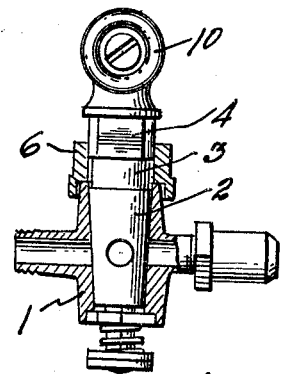
Fig. 2 is a longitudinal secton therethrough in the locked position.

As shown in Figs. 1 and 2 the valve comprises a valve body 1 in which a valve member 2 is rotatably mounted and adapted to be turned through an arch of ninety degrees to open or close the valve. The rotatable valve member 2 is provided with a portion 3 of smaller diameter and a portion 4 immediately thereabove which is substantially square in cross section. The valve body adjacent the upper end is provided with a pair of diametrically opposite ground off portions or flat faces 5 and these ground portions 5 are flat while the remainder of the valve body at the upper edge is cylindrical in form. A locking ring 6 is provided having an opening 7 in the bottom and this opening is provided with two flat sides 8 which are adapted to fit over the flat ground portions 5 on the valve body.

Figure 4:
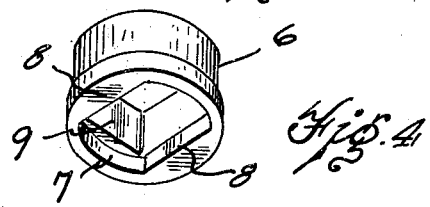
Fig. 4 is a perspective view of the locking ring used with the valve form shown in Figs. 1 and 2.

The ring 6, as shown in Fig. 4, is also provided with a square aperture 9 fitting the faces of the square portion 4 of the rotatable valve member. The locking ring 6 is shown in locked position in Fig. 2 and in the unlocked position in Fig. 1. When the valve is in the locked position shown in Fig. 2 the ring may be lifted to bring the lower edge thereof above the upper edge of the valve body 1 at which time the handle 10 may be turned to open the valve. As the handle 10 is turned the portions 8 of the ring, shown in Fig. 4, rest on the upper edge of the valve body as shown in Fig. 1, and the ring 6 will remain in the raised position as long as the valve is open. As the valve is again turned to the closed position the ring rides around on the upper edge of the valve body until the flat portions 8 of the ring come to alignment with the flat faces 5 of the valve body at which time the ring will drop by gravity to the locked position. Due to the ring fitting the square portions 4 of the rotatable valve member it is prevented from rotation in relation to the valve member but at the same time may be moved longitudinally thereof and when the ring portions 8 engage the portions 5 on the valve body the ring is prevented from rotation in relation to the valve body and also prevents rotation of the rotatable valve member.

Figure 3:
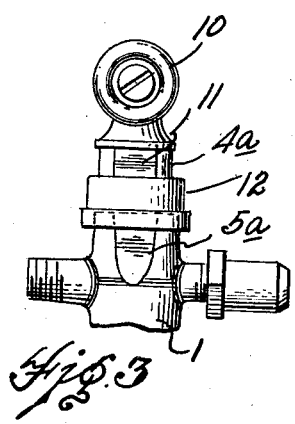
Fig. 3 is a view of an alternative form of the valve.
Figure 5:
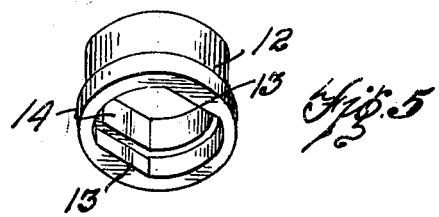
Fig. 5 is a perspective view of the locking ring used with the valve form shown in Fig. 3.

In the form shown in Fig. 3 the flat face 5a is carried out on a taper instead of being brought to an abrupt end as shown in Fig. 1 and the rotatable valve member portion 4a instead of being square is provided with two diametrically opposite flat faces 11. The locking ring 12 for this form of valve is shown more particularly in Fig. 5 and is provided with two flat faces 13 for the companion faces 5a of the valve body and with two flat faces 14 for the flat faces 11 of the rotatable valve member. The operation with this form of the device is exactly the same as the form shown in Figs. 1, 2 and 4 and has the advantage that less machine work is required to form the various parts.

Figure 6:
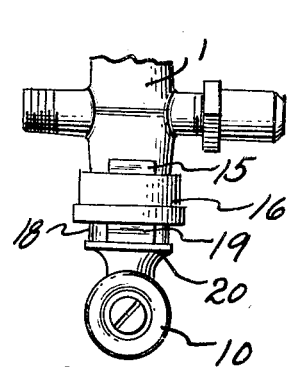
Fig. 6 is a view showing a reversed form of valve.
Figure 7:
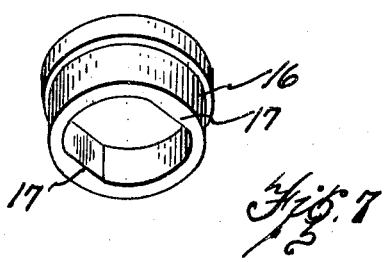
Fig. 7 is a perspective view of the locking ring used with the valve shown in Fig. 6.

In the form shown in Fig. 6 the valve is reversed in position and the valve body is provided with two diametrically opposite flat faces 15 and the locking ring 16 is provided with two flat faces 17 which always engage the flat faces 15 of the body and the ring 16 is movable up or down on the valve body. The rotatable valve member 18 is provided with two diametrically opposite flat faces 19 and the ring 16 is formed to fit the rotatable valve member 18 and the flat faces 19 when the valve is turned to closed position.

In the position shown in Fig. 6 the handle has just been turned to turn the valve to the closed position and as the flat faces 19 are brought to alignment with the flat faces 15 the ring 16 will drop down over the portion 18 and lock the valve from rotation. The member 18 is provided with a flange 20 which provides a stop for the ring 16 and the ring may be readily raised to the position shown in Fig. 6 to allow the member 18 to be turned to open the valve.

From the foregoing description it becomes evident that the device is very simple and efficient in operation, will not add greatly to the expense of the ordinary gas valve and provides a device which accomplishes the objects described.

Having thus fully described my invention, its utility and mode of operation, what I claim and desire to secure by Letters Patent of the United States is—

1. In a valve for gas ranges, a valve body provided with a flat side adjacent the end of the body, a valve member rotatably mounted in the body and also having an extending portion thereof flattened on one side, a locking ring longitudinally movable on the valve member to engage over the end of the valve body, the inner wall of which ring is formed with a flat surface fitting the flat face of the valve member and further having an additional flat portion adapted to fit over the flat face of the valve body, the said valve body having an upper end on which the locking ring may ride when moved out of engagement with the flat face of the valve body and the ring being adapted to engage over the flat face of the valve body when the flat face of the valve member is in alignment therewith thereby releasably holding the valve member from rotation.

2. In a valve for gas ranges, a valve body having the side adjacent the end formed with a flat face, a valve member rotatably mounted therein and having a flat face formed in the side thereof in the end projecting from the body, a locking ring slidable longitudinally on the projecting end of the valve member and having its inner face formed with a flat portion continuously in engagement with the flat face of the valve member preventing the ring from turning relative thereto, said ring being adapted to ride on the said end of the valve member when the valve is open and being further formed with an additional flat portion adapted to engage with the flat face of the valve body when turned to alignment therewith.

3. In a valve for gas ranges, a valve body having the side face thereof at the end formed with a flat face, a valve member rotatably mounted in the body and projecting therefrom, the projecting portion of the valve member having a flat face on one side, a locking ring having an aperture fitting over the valve body and having a flat face fitting the said flat face of the valve body, said ring also being movable longitudinally of the projecting end of the valve member and having an additional flat face fitting the said flat face of the valve member and holding the valve member and body from relative rotation when the respective flat faces of the body and valve member are in alignment.

4. In a valve for gas ranges, a valve body having the outer surface thereof adjacent the end formed with a flat portion, a valve member rotatably mounted in the body, a locking ring carried by the valve member and being rotatable therewith, said locking ring being adapted to ride on the said end of the valve body and having its inner face formed with a flat portion adapted to be turned to alignment with the flat face on the valve body when the valve is closed, the arrangement being such that the ring moves to engagement with the valve body by gravity.

5. In a valve for gas ranges, a valve body having an end formed with a flat side, a valve member rotatably mounted in the body and having a projecting end, a portion of which corresponds in form with the end of the valve body, a locking ring longitudinally movable on the valve member and having a part thereof fitting the said end portions of the valve member and further having a portion adapted to fit the said end of the valve body, the arrangement providing that when the ring is moved out of engagement with the valve body the valve member may be turned with the ring riding the end face of the body and when turned to closed position engages the body to hold the valve member from rotation.

In testimony whereof I sign this specification.

FRANK J. LIESKE.